US012059913B2

United States Patent
Andreasson et al.

(10) Patent No.: US 12,059,913 B2
(45) Date of Patent: Aug. 13, 2024

(54) METHOD AND A THERMOPLASTIC FILM FOR USE IN A PRINTED PACKAGING OF ABSORBENT HYGIENIC ARTICLES

(71) Applicant: Essity Hygiene and Health Aktiebolag, Gothenburg (SE)

(72) Inventors: Anders Andreasson, Gothenburg (SE); Erik Nordström Matthiessen, Gothenburg (SE); Jonas Jönsson, Gothenburg (SE); Elisabet Cullbrand, Gothenburg (SE); Alessandro Galatà, Ismaning (DE); Cecilia Thelin, Gothenburg (SE); Olivier Coursimaux, Kunheim (FR)

(73) Assignee: ESSITY HYGIENE AND HEALTH AKTIEBOLAG, Gothenburg (SE)

( * ) Notice: Subject to any disclaimer, the term of this patent is extended or adjusted under 35 U.S.C. 154(b) by 0 days.

(21) Appl. No.: 18/550,453

(22) PCT Filed: Mar. 26, 2021

(86) PCT No.: PCT/EP2021/058035
§ 371 (c)(1),
(2) Date: Sep. 13, 2023

(87) PCT Pub. No.: WO2022/199857
PCT Pub. Date: Sep. 29, 2022

(65) Prior Publication Data
US 2024/0092106 A1    Mar. 21, 2024

(51) Int. Cl.
*B41M 1/30*      (2006.01)
*B41M 5/00*      (2006.01)
(Continued)

(52) U.S. Cl.
CPC ............ *B41M 1/30* (2013.01); *B41M 5/0064* (2013.01); *G06K 7/10544* (2013.01); *G06F 11/0733* (2013.01)

(58) Field of Classification Search
CPC . B41M 1/30; B41M 5/0064; B65H 2301/544; G06F 3/04166; G06F 11/0733; G06F 7/10544; G06K 7/10544
See application file for complete search history.

(56) References Cited

U.S. PATENT DOCUMENTS

| 6,231,953 B1 | 5/2001 | Mossbrook et al. |
| 2006/0003657 A1 | 1/2006 | Larson et al. |

(Continued)

FOREIGN PATENT DOCUMENTS

| CN | 104010597 A | 8/2014 |
| CN | 111787897 A | 10/2020 |

(Continued)

OTHER PUBLICATIONS

International Search Report & Written Opinion for International Application No. PCT/EP2021/058035; International Filing Date: Mar. 26, 2021; Date of Mailing: Jan. 4, 2022; 16 pages.

(Continued)

*Primary Examiner* — Jennifer Bahls
*Assistant Examiner* — Quang X Nguyen
(74) *Attorney, Agent, or Firm* — CANTOR COLBURN LLP (57) ABSTRACT

The present disclosure relates to a method for establishing the suitability for printing of a thermoplastic film for use in a packaging of absorbent hygienic articles, said thermoplastic film comprising at least 30% recycled polymer material. The method comprises scanning a sample of said film for Gel Spots, defining an Amount of Gel spots and a Relative Gel Spot Coverage area, and, determining that if the Amount (Continued)

of Gel Spots is less than or equal to a first threshold and the Relative Gel Spot Coverage Area is less than or equal to a second threshold, determining that said thermoplastic film is suitable for printing. The disclosure also relates to a method of forming a package from a thermoplastic film, and to a package comprising a thermoplastic film.

33 Claims, 4 Drawing Sheets

(51) Int. Cl.
  *G06K 7/10* (2006.01)
  *G06F 11/07* (2006.01)

(56) References Cited

U.S. PATENT DOCUMENTS

| | | |
|---|---|---|
| 2016/0367412 A1 | 12/2016 | Ecker et al. |
| 2018/0028711 A1 | 2/2018 | Eschenbacher |
| 2019/0151163 A1* | 5/2019 | Ozgenc ............... A61F 13/5514 |
| 2020/0001513 A1* | 1/2020 | Jones .................... G01N 21/896 |
| 2020/0214907 A1 | 7/2020 | Bremer et al. |
| 2021/0085534 A1 | 3/2021 | McElrath et al. |

FOREIGN PATENT DOCUMENTS

| | | |
|---|---|---|
| CN | 112004506 A | 11/2020 |
| WO | 2018202570 A1 | 11/2018 |
| WO | 2020229932 A1 | 11/2020 |

OTHER PUBLICATIONS

International Preliminary Report on Patentability for International Application No. PCT/EP2021/058035; International Filing Date: Mar. 26, 2021; Date of Mailing: Mar. 20, 2023; 50 pages.
Demand under Article 31 of the Patent Cooperation Treaty for International Application No. PCT/EP2021/058035; International Filing Date: Mar. 26, 2021; Date of Receipt of Demand: Jan. 24, 2023; 80 pages.
Chinese Application No. 202180093562.3; Notice of Allowance dated Jan. 9, 2024; 8 pages.
Chinese Application No. 202180093562.3; Office Action dated Nov. 3, 2023; 10 pages.

* cited by examiner

METHOD AND A THERMOPLASTIC FILM FOR USE IN A PRINTED PACKAGING OF ABSORBENT HYGIENIC ARTICLES

CROSS REFERENCE TO RELATED APPLICATIONS

This application is a National Stage Application of PCT/EP2021/058035, filed Mar. 26, 2021, which is incorporated by reference in its entirety herein.

TECHNICAL FIELD

The present disclosure relates to a method for establishing the suitability for printing of a thermoplastic film for use in a packaging of absorbent hygienic articles, the thermoplastic film comprising at least 30% recycled polymer material. The disclosure also relates to a method for forming a package of a thermoplastic film, and to a package for absorbent hygienic articles comprising thermoplastic film.

BACKGROUND

Absorbent hygienic articles, such as for example diapers, feminine hygiene articles, incontinence articles, hygiene tissues, toilet paper, napkins and the like, are conventionally stored, distributed and sold in packagings comprising a plurality of articles. Some articles may also be provided in single packagings, comprising one article only. The packagings are conventionally disposable, i.e. intended to be used only once and then discarded. Such packings may conventionally be made from or comprise a thermoplastic film.

There is a desire to increase sustainability in the field of packagings for absorbent hygienic articles. To this end, there is a desire to form the thermoplastic films for the packagings at least partly from recycled polymer materials.

However, there is a problem in that recycled polymer materials often come from unknown sources, and may include a large variety of different polymer materials. Accordingly, thermoplastic films produced by or including recycled polymer materials may display very different properties depending on the content of the batch of recycled material used in the production. To enable use of such thermoplastic films in large scale production, there is a need to swiftly and accurately determine which thermoplastic films fulfil the need for the intended final purpose of the thermoplastic film, and which do not.

Thermoplastic films used in packagings for absorbent hygiene products typically range between 20 and 100 µm in thickness. To be suitable for use in packagings, the thermoplastic films should display a number of properties depending on the need of the particular packaging. For example, the thermoplastic film may need to display a certain tensile strength and/or drapability.

If the thermoplastic film is to be printed before or after forming the packaging for absorbent hygienic articles, it has been realised that particular concerns are necessary. If the thermoplastic film displays visual irregularities, the visual quality of the print on the thermoplastic film may be impaired. Although irregularities in the thermoplastic film before printing might be visually recognised, the full effect of those irregularities on the print may not be apparent until after the printing has been performed. Accordingly, printed film or complete packagings of printed film may have to be discarded after a manual visual inspection thereof, for not fulfilling aesthetic requirements. The discarding of printed thermoplastic film material constitutes a waste of material. This waste is particularly troublesome as it appears only after the film is printed.

Manual inspection (e.g. using a microscope) of a thermoplastic film and estimation of the number of irregularities in thermoplastic films have sometimes been performed to evaluate the quality of the film before printing. However, such methods give generally subjective results and/or are relatively time consuming which is unsatisfactory when the need for estimating film quality increases as an effect of using recycled material.

Accordingly, there is a need for establishing the suitability for printing of a thermoplastic film comprising recycled material for use in a packaging of absorbent hygienic articles. Also, there is a need for a printed packaging of absorbent hygienic articles, which comprises recycled material, and which provides a satisfactory print quality.

SUMMARY

At least one of the above-mentioned needs is fulfilled by a method for establishing the suitability for printing of a thermoplastic film for use in a packaging of absorbent hygienic articles, the thermoplastic film comprising at least 30% recycled polymer material, as described in the below.

The method comprises:
Providing a sample of the thermoplastic film, the sample preferably being 10 cm×10 cm;
Scanning the sample to provide a pixelized image of the sample;
Computer analyzing the pixelised image using a thresholding method to transfer the image to a binary image in which each pixel is determined as either dark or light;
Defining each group of neighbouring pixels determined to be dark as a Gel Spot,
Defining a Gel Spot Size for each Gel Spot being the circle equivalent diameter to the pixel area of the Gel Spot;
Determining an Amount of Gel Spots indicative of the number of Gel Spots in the sample, which have Gel Spot Size greater than or equal to 150 µm; and
Determining a Relative Gel Spot Coverage Area indicative of the relative area of the sample covered by Gel Spots having a Gel Spot Size greater than or equal to 150 µm, using the circle equivalent diameter; and
if the Amount of Gel Spots is less than or equal to a first threshold and the Relative Gel Spot Coverage Area is less than or equal to a second threshold, determining that the thermoplastic film is suitable for printing; and
if the Amount of Gel Spots is greater than the first threshold and/or the Relative Gel Spot Coverage Area is greater than the second threshold, determining that the thermoplastic film is not suitable for printing.

In the present disclosure, the term "Gel Spot" is used to describe a visual defect in a film. Such defects may for example originate from non-polymeric matter in the recycled material mix (such as e.g. fibres of wood, paper, or other materials), from polymer material having a melt temperature differing from the main residue, from unevenly melted or distributed polymer material. The term "Gel Spot" is used herein for any such visual defects in the film, regardless of origin. The number, size and distribution of Gel Spots in thermoplastic film made at least partly from recycled polymer material may vary greatly depending on the material in the source of recycled polymer material.

With the method described in the above, the Relative Gel Spot Coverage Area which is indicative of the relative area of a sample of the film which is covered by Gel Spots is used to discern thermoplastic films which are suitable for printing from films which are not suitable for printing together with the Amount of Gel Spots. The method considers Gel Spots having a Gel Spot Size greater than or equal to 150 µm as measured by the method disclosed herein.

Use of the method enables non-manual evaluation of thermoplastic films comprising at least 30% recycled polymer material, which evaluation may be made before the printing thereof, and therefore contribute to more efficient manufacturing and induce less waste of material.

The method involves providing a sample of the thermoplastic film. Optionally, the sample may be a selected sample area of a larger sheet or roll of thermoplastic film. Optionally, the sample may be cut from the thermoplastic film, which may be suitable since the sample may then conveniently be brought to a separate scanner for evaluation.

The sample size may be selected so as to ensure that a relevant measure of the Relative Gel Spot Coverage Area may be achieved. This may depend on the estimated distribution of Gel Spots over the area of the thermoplastic film. For example, a sample size of 10×10 cm may be suitable.

The sample is scanned to provide a pixelized image of the sample. Suitable scanners for performing such scanning and providing the result of the scanning in a form suitable for computer analysis are known in the art.

As known in the art, the sample may be scanned a plurality of times providing a plurality of images, over which average values may be formed for providing as accurate results as possible. For example, the sample may be scanned three times and average values formed over the three scans to provide the pixelized image of the sample.

The resolution of the pixelization should be sufficient so as to enable identification of gel spots having a Gel Spot Size (as explained below) greater than or equal to 150 µm. For example, the resolution of the pixelization may be at least 1700 dpi (dots per inch). The resolution of the pixelization may for example be at least 2400 dpi (dots per inch), for example it may be 2400 dpi.

Three scans of the sample are performed, and the resulting images are combined before continued image analysis.

The scanning equipment may introduce some brightness variation. To account for this variation, a standardisation of the pixelized image may be performed, wherein a pixel value is the average of Px=((Px−Avg (ROI))/Std (ROI) in two perpendicular directions, see FIG. 6.

The pixelized image resulting from the scanning is computer analysed using a thresholding method to provide a binary image in which each pixel is determined to be either dark or light.

For example, the pixelized image may be computer analysed using a constant greyscale threshold method. A suitable constant greyscale threshold may be determined e.g. by comparison with reference samples being manually evaluated for the occurrence of Gel Spots.

Each group of neighbouring pixels of the binary image which are deemed to be dark is defined as a Gel Spot.

For example, the binary image may be formed using the light component over the RGB spectrum.

For each Gel Spot, a Gel Spot Size is defined being the circle equivalent diameter to the pixel area of the Gel Spot.

Gel Spots with a Gel Spot Size greater than or equal to 150 µmare counted in the sample, the number thereof being a determined Amount of Gel Spots.

Further, a Relative Gel Spot Coverage Area indicative of the relative area of the sample covered by Gel Spots having a Gel Spot Size greater than or equal to 150 µm, using the circle equivalent diameter is determined.

In accordance with the method disclosed herein, if the Amount of Gel Spots is less than or equal to a first threshold and the Relative Gel Spot Coverage Area is less than or equal to a second threshold, it is determined that the thermoplastic film is suitable for printing.

The first threshold is indicative of a limit for the number of Gel Spots in the film, whereas the second threshold is indicative of a limit for the proportion of the area of the film which are covered by the Gel spots. Thus, by considering both these measures, evaluation of the thermoplastic films may be performed.

The first and second threshold may be set depending on the requirements of the printing to be applied to the thermoplastic film. For example, a detailed print such as small printed text may require relatively low thresholds to provide a desired accuracy of the print. However, e.g. a large area covered by a single colour might require relatively low thresholds since a gel spot on a large single coloured area may stand out as very obviously detectable. For setting the thresholds, it may be investigated what print quality of the packaging is perceived as acceptable to a user.

In addition to the above-mentioned method steps, further steps may be applied e.g. for removing clusters of neighbouring pixels deemed to be dark, but not likely to be Gel Spots. For example, the method may comprise a step of evaluating the solidity of each group of neighbouring pixels determined to be dark. Such a step may include comparing the solidity of each group of neighbouring pixels determined to be dark to a solidity demand threshold.

Also, the method may include e.g. removing small groups of pixels from the pixelized image before determining the Gel Spot Size and the Amount of Gel Spots. For example, only groups of pixels having a size greater than a threshold number of pixels may be analysed for determining the Gel Spot Size and the Amount of Gel Spots, where said threshold number of pixels may be set so as to remove groups of pixels which may nevertheless never reach the limit for Gel Spot Size being greater than or equal to 150 µm.

Optionally, the first threshold is less than or equal to 450 per 100 cm$^2$ sample, such as less than or equal to 300 per 100 cm$^2$ sample.

Optionally, the second threshold is less than or equal to 20%, such as less than or equal to 12%.

The method may be used for films having a transparency such that it is possible to scan the film and discern any gel spots. For example, the method may be used for films having an opacity of 70% or less.

Optionally, the film comprises coloured pigments in the film resin. Such coloured pigments provide a uniform colour to the thermoplastic film which per se would not interfere with the determination of the Gel Spots.

Optionally, the film has a thickness of between 20 and 70 µm.

Optionally, the film comprises less than 80% recycled polymer material.

Optionally, the film comprises:
a. a total sum of phthalates being in the range 0.05 to 250 mg/kg (ppm), such as 0.05 to 100 mg/kg (ppm) or such as 0.05 to 20 mg/kg (ppm); and/or
b. a total sum of organic tin compounds being in the range 0.0003 to 0.5 mg/kg (ppm), such as 0.0003 to 0.1 mg/kg (ppm) or such as 0.0003 to 0.02 mg/kg (ppm); and/or c. a total sum of heavy metals being in the range 0.1 to 100 mg/kg (ppm), such as 0.1 to 60 m/kg (ppm) or 0.1 to 30 mg/kg (ppm); and/or
d. a total sum of Bisphenol A being in the range 0.05 to 20 mg/kg (ppm), such as 0.05 to 10 mg/kg (ppm) or 0.05 to 5 mg/kg (ppm).

The total sums of each group of chemicals, e.g. phthalates, organic tin compounds, heavy metals and/or Bisphenol A in the film may preferably be analysed prior to forming the film, on the recycled resin material. Alternatively, the total sums of each group of chemicals may be analysed on the film when produced. The total sums of these substances are relevant for the film's suitability for forming a packaging for hygienic products.

Organic tin compounds include at least TBT, TPhT. Heavy metals include at least Pb, Hg, Cd and hexavalent Cr. Phthalates include at least DINP, DEHP, DNOP, DIDP, BBP, DBP, DIBP, DPHP, DCHP. (DINP=diisononyl phthalate, DEHP=di-(2-ethylhexyl) phthalate, DNOP=di-n-octyl phthalate, DIDP=diisodecyl phthalate, BBP=benzyl-butyl phthalate, DBP=di-butyl phthalate, DIBP=di-isobutyl phthalate, DPHP=di-(2-propylheptyl) phthalate, DCHP=dicyclohexyl phthalate)

Optionally, the film is a transparent, glossy film which a haze may be determined.

Optionally, the method comprises determining a haze of the thermoplastic film, and
  if the haze is within a haze range, determining that the film is suitable for printing and for a packaging of hygienic absorbent products, and
  if the haze is outside of the haze range, determining that the film is unsuitable for printing and for a packaging of hygienic absorbent products, wherein the haze range is less than 25%, such as less than 20%, or 4 to 18%.

Haze is measured as the percentage of incident light scattered by more than 2.5° through the plastic film. There are several factors responsible for light scattering including for example impurities contained in the thermoplastic film. The haze is an additional factor which may be relevant for the suitability for printing the film. Haze may be measured in accordance with ASTM D1003.

Optionally, the method comprises:
  determining a MD force at 5% elongation in the machine direction of the film, and
  if the MD force at 5% elongation is within a MD force at 5% elongation range, determining that the film is suitable for printing and for a packaging for hygienic absorbent product, and
  if the MD force at 5% elongation is outside of the MD force at 5% elongation range, determining that the film is unsuitable for printing and for a packaging for hygienic absorbent products,
  wherein the MD force at 5% elongation range is greater or equal to 3 N/15 mm, and optionally 4 to 9 N/15 mm.

Optionally, the method comprises:
  determining a CD force at 5% elongation in the cross direction of the film, and
  if the CD force at 5% elongation is within a CD force at 5% elongation range, determining that the film is suitable for printing and for a packaging for hygienic absorbent product, and
  if the CD force at 5% elongation is outside of the CD force at 5% elongation range, determining that the film is unsuitable for printing and for a packaging for hygienic absorbent products,
  wherein the CD force at 5% elongation range is greater or equal to 3 N/15 mm, and optionally 4 to 9 N/15 mm.

The MD and/or CD tensile force at 5% elongation of the thermoplastic film may be relevant for its suitability to form a packaging for a hygienic product. The MD and/orCD tensile force at 5% elongation may be determined in accordance with DIN EN ISO 527.

Optionally, the method comprises:
  determining a CD 2% secant modulus in the cross direction of the film, if the CD 2% secant modulus is within a CD 2% secant modulus range, determining that the film is suitable for printing and for a packaging for hygienic absorbent product, and
  if the CD 2% secant modulus is outside of the CD 2% secant modulus range, determining that the film is unsuitable for printing and for a packaging for hygienic absorbent products,
  wherein the CD 2% secant modulus range is from 200 to 600.

Optionally, the method comprises:
  determining a MD 2% secant modulus in the machine direction of the film, and if the MD 2% secant modulus is within a MD 2% secant modulus range, determining that the film is suitable for printing and for a packaging for hygienic absorbent product, and
  if the MD 2% secant modulus is outside of the MD 2% secant modulus range, determining that the film is unsuitable for printing and for a packaging for hygienic absorbent products,
  wherein the MD 2% secant modulus range is from 200 to 550.

The modulus of a material is expressed as the applied stress divided by the resulting strain, which may be visualised by a stress-strain curve. The 2% secant modulus represents a straight line drawn from the origin to a particular point representing 2% on the stress-strain curve.

The MD and/or CD 2% secant modulus of the thermoplastic film may be relevant for its suitability to form a packaging for a hygienic product. The MD and/or CD 2% secant modulus may be determined in accordance with DIN EN ISO 527.

Optionally, the method comprises determining a kinetic coefficient of friction of the film,
  if the kinetic coefficient of friction is within a coefficient of friction range, determining that the film is suitable for printing and for a packaging for hygienic absorbent product, and
  if the kinetic coefficient of friction is outside of a coefficient of friction range, determining that the film is unsuitable for printing and for a packaging for hygienic absorbent products,
  wherein the coefficient of friction range is greater or equal to 0.1, optionally less than or equal to 0.4, and optionally 0.1 to 0.4.

The kinetic coefficient of friction may be determined in accordance with DIN EN ISO 8295.

In a second aspect, there is provided a method of forming a package for absorbent articles comprising:
  Providing a thermoplastic film material determined to be suitable for printing for use in a packaging for hygienic absorbent articles in accordance with any of the options as set out in the above, and
  Forming a package for hygienic absorbent articles comprising the thermoplastic film.

Optionally, the method further comprises printing at least a portion of the film.

Optionally, the step of forming a package comprises forming a package of the thermoplastic film such that the thermoplastic film forms an outer surface of the package.

Optionally, the package comprises the thermoplastic film as a co-extruded monolayer film.

Optionally, the step of forming a package comprises folding the thermoplastic film to form a pocket or bag.

Optionally, the method comprises filling the package with absorbent hygienic articles.

Optionally, the absorbent hygienic articles are sanitary articles, such as e.g. diapers, feminine towels, panty liners, and/or incontinence products or garments.

Optionally, the absorbent articles comprise absorbent tissue paper or nonwoven, such as e.g. napkins, tissues, toilet paper or household paper.

The absorbent articles may be folded, such as e.g. folded napkins or tissues, or unfolded. Optionally, the absorbent articles may be rolled, such as rolls of absorbent tissue paper, e.g. household paper or toilet paper.

Optionally, the absorbent articles are arranged in the packaging in the form of a stack of sanitary articles. Optionally, the method comprises filling the package with a stack of sanitary articles.

Optionally, the method comprises filling the package with a single absorbent hygienic article, so as to provide a package including a single article only. Optionally, the single absorbent hygienic article is a sanitary article.

Optionally, the method comprises forming an array of packages of the film, the array comprising at least 1000 packages, such as at least 10 000 packages.

In a third aspect, there is provided a package for an absorbent article made by the method according to the second aspect.

In a fourth aspect, there is provided a package for an absorbent article comprising a thermoplastic film, wherein the thermoplastic film comprises at least 30 to 80% by weight recycled polymers, and the thermoplastic film has a continuous unprinted area of at least 10×10 cm, wherein the thermoplastic film has a Gel Spot Amount being less than or equal to 450 and a Gel Spot Relative Coverage Area being less than or equal to 20%, as determined by the specific Gel Spot Estimation Method described in the below detailed part of this application.

Optionally, the thermoplastic film has a printed area outside of the continuous unprinted area.

Optionally, the thermoplastic film, at least in the unprinted area, is transparent.

Optionally, the thermoplastic film comprises coloured pigment in the film resin.

Optionally, the film has a thickness of between 20 and 70 µm.

Optionally, the film comprises less than 80% recycled polymer material.

Optionally, the film comprises:
a. a total sum of phthalates being in the range 0.05 to 250 mg/kg (ppm), such as 0.05 to 100 mg/kg (ppm) or such as 0.05 to 20 mg/kg (ppm); and/or
b. a total sum of organic tin compounds being in the range 0.0003 to 0.5 mg/kg (ppm), such as 0.0003 to 0.1 mg/kg (ppm) or such as 0.0003 to 0.02 mg/kg (ppm); and/or
c. a total sum of heavy metals being in the range 0.1 to 100 mg/kg (ppm), such as 0.1 to 60 m/kg (ppm) or 0.1 to 30 mg/kg (ppm); and/or
d. a total sum of Bisphenol A being in the range 0.05 to 20 mg/kg (ppm), such as 0.05 to 10 mg/kg (ppm) or 0.05 to 5 mg/kg (ppm).

Optionally, the film has a haze being less than 25%, such as less than 20%, or 4 to 18%.

Optionally, the film has a MD force at 5% elongation in the machine direction of the film,
wherein the MD force at 5% elongation range is greater or equal to 3 N/15 mm, and optionally 4 to 9 N/15 mm.

Optionally, the film has a CD force at 5% elongation in the cross direction of the film being greater or equal to 3 N/15 mm, and optionally 4 to 9 N/15 mm.

Optionally, the film has a CD 2% secant modulus in the cross direction of the film,
wherein the CD 2% secant modulus being from 200 to 600 MPa.

Optionally, the film has a MD 2% secant modulus in the machine direction of the film being from 200 to 550 MPa.

Optionally, the film has a kinetic coefficient of friction, being greater or equal to 0.1, optionally less than or equal to 0.4, and optionally 0.1 to 0.4.

In a fifth aspect, there is provided an array of at least 1000 packages according to the fourth aspect as set out in the above, the packages having similar appearance and content.

Features, explanations and measurement methods mentioned in the above in relation to one of the aspects of the disclosure may be similarly applied to other aspects of the disclosure.

BRIEF DESCRIPTION OF THE DRAWINGS

With reference to the appended drawings, below follows a more detailed description of variants of the methods and devices disclosed herein, the variants being cited as examples.

FIG. 2b is a histogram over the distribution of Gel Spot Sizes in FIG. 2a;

DETAILED DESCRIPTION

Figure 1:
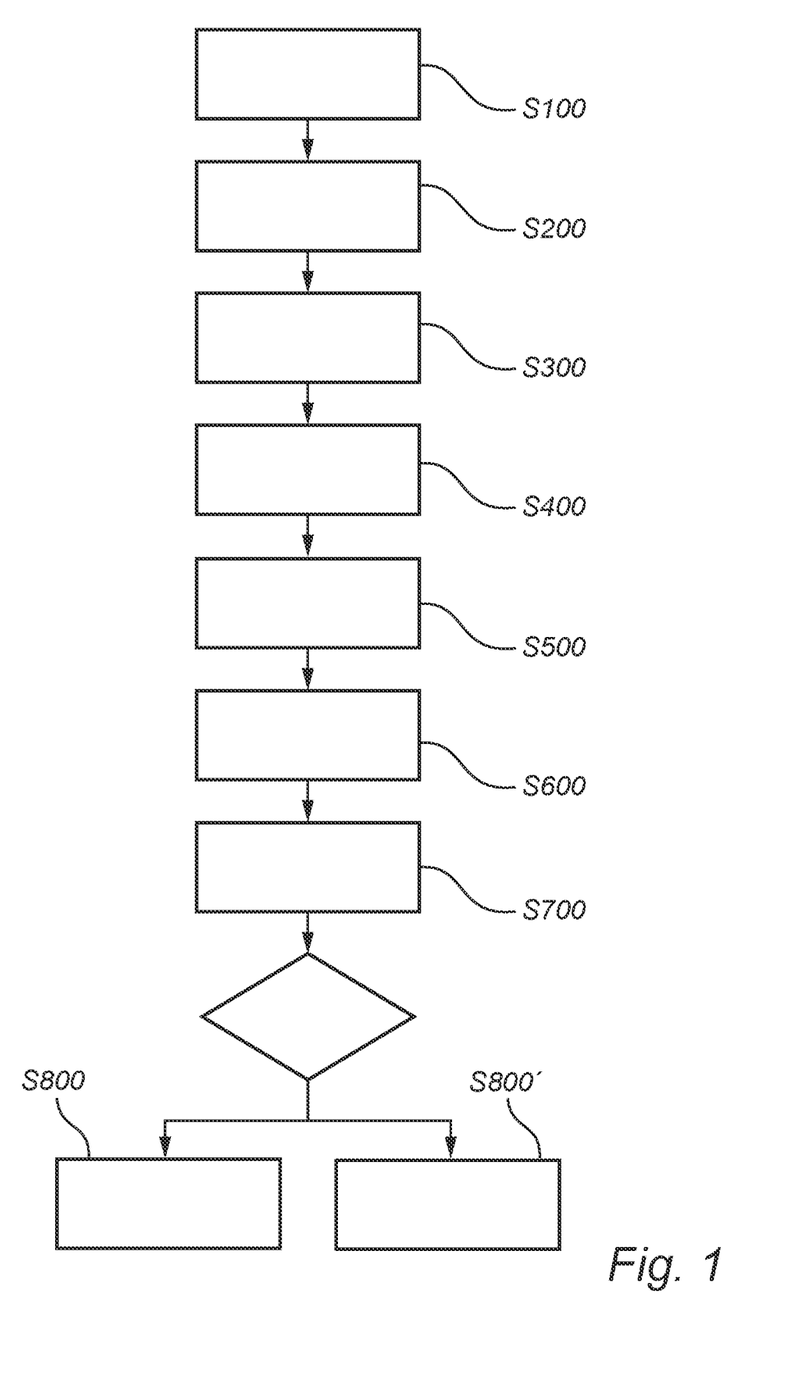
FIG. 1 is a flow chart schematically illustrating a method for establishing the suitability for printing of a thermoplastic film for use in a packaging of absorbent hygienic articles.

FIG. 1 is a flow chart schematically illustrating a method for establishing the suitability for printing of a thermoplastic film for use in a packaging of absorbent hygienic articles, the thermoplastic film comprising at least 30% recycled polymer material, the method comprising:

Providing a sample of the thermoplastic film, the sample preferably being 10 cm×10 cm (S100);

Scanning the sample to provide a pixelized image of the sample (S200);

Computer analyzing the pixelised image using a threshold method to transform the image to a binary image wherein each pixel is deemed either light or dark, (S300);

Defining each group of neighbouring pixels deemed to be dark as a Gel Spot (S400);

Defining a Gel Spot Size for each Gel Spot being the circle equivalent diameter to the pixel area of the Gel Spot (S500);

Determining an Amount of Gel Spots indicative of the number of Gel Spots in the sample, which have Gel Spot Size greater than or equal to 150 μm (S600); and Determining a Relative Gel Spot Coverage Area indicative of the relative area of the sample covered by Gel Spots having a Gel Spot Size greater than or equal to 150 μm, using the circle equivalent diameter (S700); and if the Amount of Gel Spots is less than or equal to a first threshold and the Relative Gel Spot Coverage Area is less than or equal to a second threshold, determining that the thermoplastic film is suitable for printing (S800); and if the Amount of Gel Spots is greater than the first threshold and/or the Relative Gel Spot Coverage Area is greater than the second threshold, determining that the thermoplastic film is not suitable for printing (S800').

The method may use a RGB colour model (RGB Red Green Blue) for computer analysing the pixelized image.

The threshold method to transform the image to a binary image may be a greyscale threshold method.

In the following, a specific Gel Spot Estimation Method is described. Although in this application, it is disclosed how a more general method may be used, it is to be understood that the disclosure also relates to this specific Gel Spot Estimation Method per se. In particular, the disclosure also relates to a package made from a film displaying an Amount of Gel Spots is less than or equal to 300, for example less than or equal to 400, and a Relative Gel Spot Coverage Area being less than or equal to 12%, for example less than or equal to 20% as determined with the specific Gel Spot Estimation Method. Also the disclosure relates to package comprising a film having an unprinted area, wherein in the unprinted area the film displays an Amount of Gel Spots is less than or equal to 300, for example less than or equal to 400, and a Relative Gel Spot Coverage Area being less than or equal to 12%, for example less than or equal to 20%, as determined by the specific Gel Spot Estimation Method.

Description of the Gel Spot Estimation Method

A sample area of the film having the size of 100×100 mm is to be scanned.

To provide a sample of the thermoplastic film (S100), a sample of 110×110 mm is cut from the film. A frame defining the open area 100×100 mm is positioned over the sample to define the area to be scanned.

To perform the step of scanning the sample to provide a pixelized image of the sample (S200), the frame with the sample is positioned with the film side towards the scanner glass. The sample is to lay flat and relaxed without wrinkles. The scanner is started.

The scanner used is an Epson Perfection V750 Pro, with the following settings:

Document type: Film (with film side)
Film type: Positive film
Picture type: 24-bit colour
Resolution: 2400
Correction: off
Configuration: no colour correction The sample is scanned three times without moving the sample or frame.

The scanned images are provided to a computer where they are computer analysed as pixelized images.

For performing the step of computer analyzing the pixelised image using the RGB spectrum (Red, Green, Blue) (S300), Matlab is used.

The images are formed in the RGB spectrum.

Initially, an average of the R, G and B channels of all three images is made over every pixel so as to form a combined image.

Figure 6:
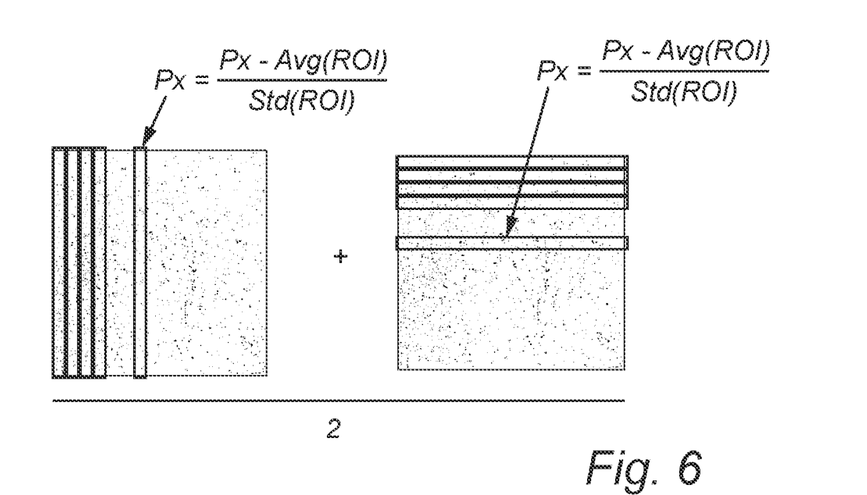
FIG. 6 illustrates the standardization of the scanned image.

A standardization of the light component of the combined image as explained in the above and with reference to FIG. 6 may be performed to account for any brightness variation.

The standardized image is then transferred to a binary image where each pixel is determined to be either dark or light. All pixels above a constant greyscale threshold are categorised as gel spot pixels. The constant greyscale threshold is a constant value which is applied after the image has been standardized. The constant greyscale threshold may for example be determined by optimising the threshold using a manually counted number of gel spots in a sample as a reference.

The greyscale threshold used in this example method was −4.05.

Each group of neighbouring gel spot pixels is determined to be a Gel Spot.

To define a Gel Spot Size for each Gel Spot being the circle equivalent diameter to the pixel area of the Gel Spot (S500), and to Determine an Amount of Gel Spots indicative of the number of Gel Spots in the sample, which have Gel Spot Size greater than or equal to 150 μm (S600), and to determine a Relative Gel Spot Coverage Area indicative of the relative area of the sample covered by Gel Spots having a Gel Spot Size greater than or equal to 150 μm, using the circle equivalent diameter (S700), Matlab function was used.

The circle equivalent diameter may be calculated as sqrt(4*(Pixel area)/pi). The circle equivalent diameter corresponds to the diameter (μm) the Gel Spot would have if it was in the shape of a circle having the same area as the pixel area of the Gel Spot.

The image was adjusted by removing small clusters of neighbouring pixels using a Matlab algorithm called bwareopen (image, p, conn), where p=size of clusters to be automatically removed. P was set to 15, and conn to 4. "P" represents the size of clusters to be automatically removed, and "conn" the connectivity.

In addition, an evaluation of the solidity of each group of neighbouring pixels determined to be dark (gel spot pixels) was used to determine which groups are true gel spots.

The solidity compares the pixel area of a group of gel spot pixels to the area of the smallest possible rectangle that could encase the group of gel spot pixels. The solidity is defined as the (gel spot pixel area)/(the area of the smallest possible rectangle that could encase the group). In this case, the solidity demand was set to 0.3, i.e. a group of neighbouring pixels having a solidity less than 0.3 is deemed not to be a Gel Spot.

The result from the Matlab computer analysis will be expressed as an Amount of Gel Spots and a Relative Gel Spot Coverage Area.

In this example, the first threshold applied is 300 per 100 cm$^2$ sample, and the second threshold applied is 12%. Accordingly, if the Amount of Gel Spots is less than or equal to 300 and the Relative Gel Spot Coverage Area is less than or equal to 12%, it is determined that the thermoplastic film is suitable for printing (S800).

A film which is deemed suitable for printing may optionally be further evaluated regarding the additional parameters mentioned in the summary section in the above.

In the following, various parameters measured on three different thermoplastic film samples will be shown. The first sample 01 is a thermoplastic film made by virgin material, hence comprising no recycled polymer material. The virgin material is in this case a polyethylene material, i.e. a fossil-based polymer material. Thus, sample 01 is not a sample as encompassed by the present disclosure, but constitutes a reference for comparison only. Sample 02 is a thermoplastic film comprising 33% recycled polymer material (PCR), with the remainder being of the same virgin material as sample 01. Sample 03 is a thermoplastic film comprising 55% recycled polymer material (PCR), with the remainder being of the same virgin material as sample 01.

The recycled polymer material in sample 02 and sample 03 comprises an unknown mix of recycled polymer materials. The recycled polymer materials in sample 02 and sample 03 come from the same recycled material sources.

All three samples 01, 02, 03 are monolayer extruded films.

All three samples were evaluated using the Gel Count method as described above to determine the Gel Spot Amount and the Relative Gel Spot Area, and a number of additional parameters as indicated in the table were also measured. As seen in the tables below, the Amount of Gel Spots is less than or equal to 300 and the Relative Gel Spot Coverage Area is less than or equal to 12% for all three samples. As indicated in the tables, a number of additional properties of the thermoplastic film materials were also measured.

| Sample | % PCR | Thickness (um) | MD2% secant modulus (MPa) | MD2% secant modulus (MPa) |
|---|---|---|---|---|
| 01 | 0 | 25 | 372 | 464 |
| 02 | 33 | 25 | 299 | 348 |
| 03 | 55 | 25 | 320 | 345 |

| Sample | % PCR | MD force at 5% elongation (N/15 mm) | CD force at 5% elongation (N/15 mm) | Kinetic (dyn) Coeff of Friction (MD) (i/i) | Kinetic (dyn) Coeff of friction (CD) (i/i) | Haze (%) | Gel Spot Amount | Relative Gel Spot Area |
|---|---|---|---|---|---|---|---|---|
| 01 | 0 | 6.3 | 7.8 | 0.33 (0.33) | 0.15 (0.14) | 15.5 | 176 | 7.59 |
| 02 | 33 | 5.4 | 5.9 | 0.15 (0.12) | 0.14 (0.12) | 10.9 | 134 | 6.38 |
| 03 | 55 | 5.7 | 5.9 | 0.18 (0.16) | 0.14 (0.12) | 13 | 144 | 7.16 |

The measured parameters as indicated in the table above may be compared with the desired ranges as set out in the summary section in the above. Accordingly, it is found that both sample 02 with 33% recycled material and sample 03 with 55% recycled material display properties which render the materials suitable for printing and for use as packing materials for hygienic products.

Figure 2A:
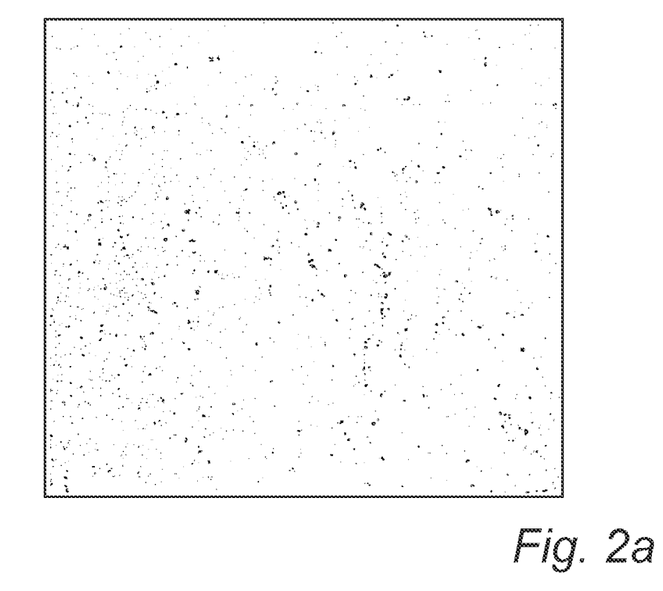
FIG. 2a is an example of a scanned image from a sample of a thermoplastic film.
Figure 2B:
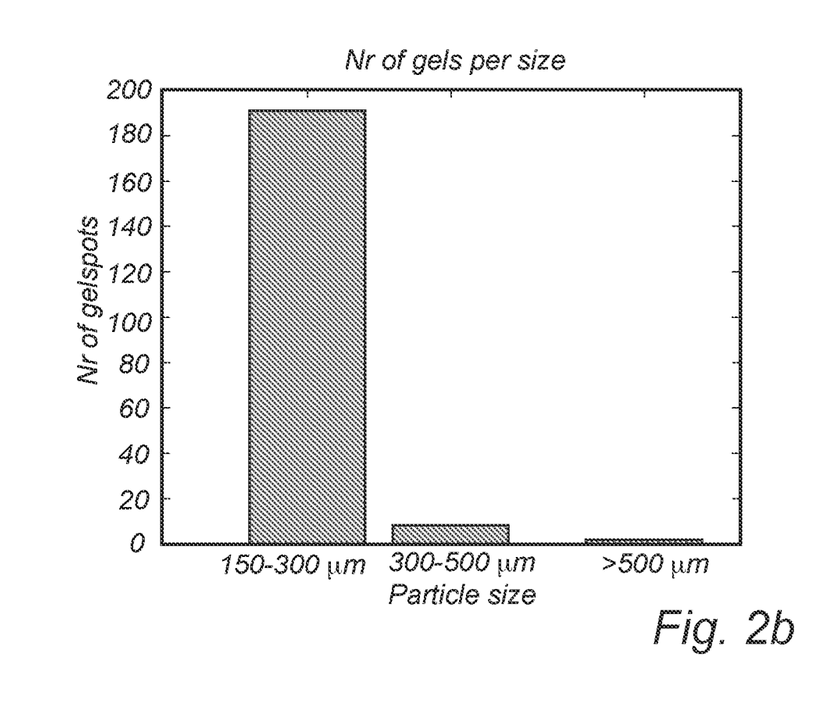

FIGS. 2a and 2b are examples from one scanned image of a sample, which are included to illustrate the distribution of Gel Spots over the thermoplastic film. FIG. 2a is an example of a scanned image of a thermoplastic film, in this case, one of the three images taken for sample 02. Some of the gel spots may be seen as darker spots in the image. FIG. 2b is a histogram showing the distribution of gel spots in the image of FIG. 2a. In this histogram, the Amount of Gel Spots having sizes in the range 150 to 300 µmare shown in the first staple as seen from the left, the Amount of Gel Spots having sizes in the range 300 to 500 µm are shown in the second staple, and the Amount of Gel spots having sizes in the range 500 and upwards are shown in the third staple As seen from FIG. 2b, in this example histogram the Amount of Gel Spots of Gel spots having sizes between 150 and 300 µmis about 190, the Amount of Gel Spots of Gel spots having sizes between 300 and 500 µmis about 10, and the Amount of Gel Spots of Gel spots having sizes greater than 500 µm are clearly less than 10. Accordingly, the example histogram illustrates an example where the total Amount of Gel Spots is less than 300.

As indicated in the above example of a specific Gel Spot Count method it is proposed that the first threshold in the general method is set to 300 (the Amount of Gel Spots is less than or equal to 300) and the second threshold to 12% (the Relative Gel Spot Coverage Area is less than or equal to 12%). These thresholds have been found to result in an acceptable print quality upon visual inspection of the thermoplastic films after printing. As such, the methods proposed herein provide an advantage over prior procedures for estimating whether a thermoplastic film will be suitable for printing and for forming a package for hygienic products. Such procedures could for example include manual estimation of the occurrence of Gel Spots by visual inspection of a sample of the film e.g. in a microscope. By comparison, the methods proposed herein provide increased reliability and increases efficiency.

Figure 3:
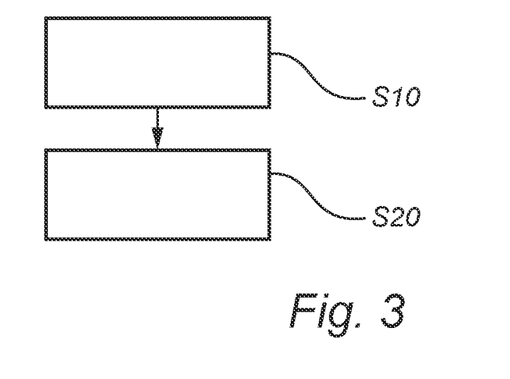
FIG. 3 is a flow chart schematically illustrating a method for forming a packaging of absorbent hygienic articles from a thermoplastic film.

FIG. 3 is a schematic flow chart of a method for forming a package for absorbent articles comprising:
  Providing a thermoplastic film material determined to be suitable for printing for use in a packaging for hygienic absorbent articles in accordance with any of the methods as disclosed herein (S10), and
  Forming a package for hygienic absorbent articles comprising the thermoplastic film (S20).

The method may comprise printing at least a portion of the film, taking advantage of the fact that the film is indeed determined to be suitable for printing.

The package may be formed by any desired method for forming a package for hygienic absorbent articles comprising the thermoplastic film.

In particular, the step of forming a package may comprise forming a package of the thermoplastic film such that the thermoplastic film forms an outer surface of the package.

Optionally, the package comprises the thermoplastic film as a co-extruded monolayer film.

Optionally, the step of forming a package comprises folding the thermoplastic film to form a pocket or bag. Further, the method may comprise filling the package with a single or with a plurality of absorbent hygienic articles. For example, the absorbent articles may be in the form of a stack of sanitary articles.

Figure 4:
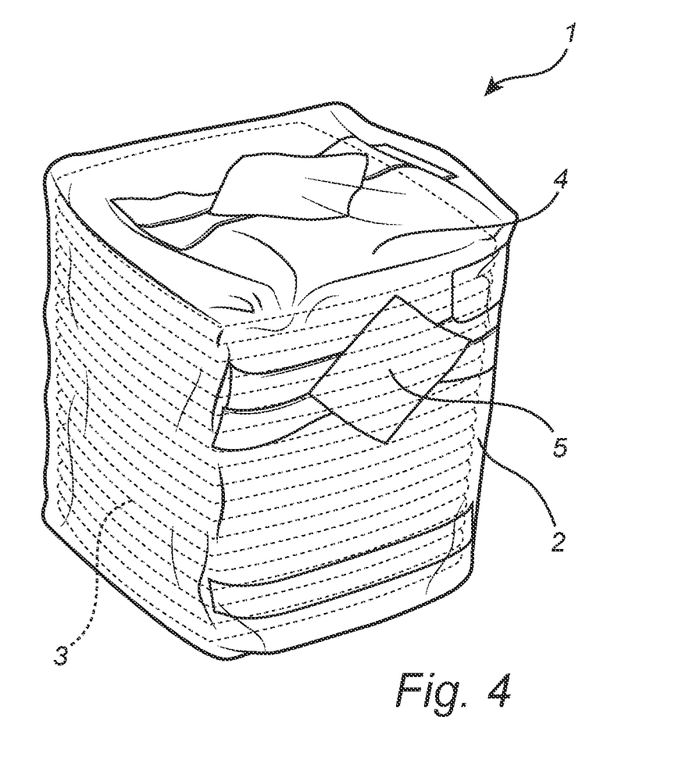
FIG. 4 illustrates a variant of a packaging comprising absorbent hygienic article.

FIG. 4 illustrate a package 1 formed from a thermoplastic film 2. The film 2 forms an outside of the package 1, which outside is at least partially provided with a print. The package 1 contains absorbent hygienic articles 3, in this case a stack of absorbent hygienic articles 3.

The film 2 may be printed using any conventional technique for printing of thermoplastic films for the purpose of forming packagings for absorbent hygiene products. Optionally, the film may be printed by flexoprinting.

Optionally, and as illustrated in FIG. 4 the film is printed such that the package displays a non-printed area 4 and a printed area 5. When the package 1 includes a non-printed area 4 having as size of at least 10×10 cm, the Amount of Gel Spots and the Relative Gel Spot Coverage Area may be measured in this non-printed area 4 of the package.

Figure 5:
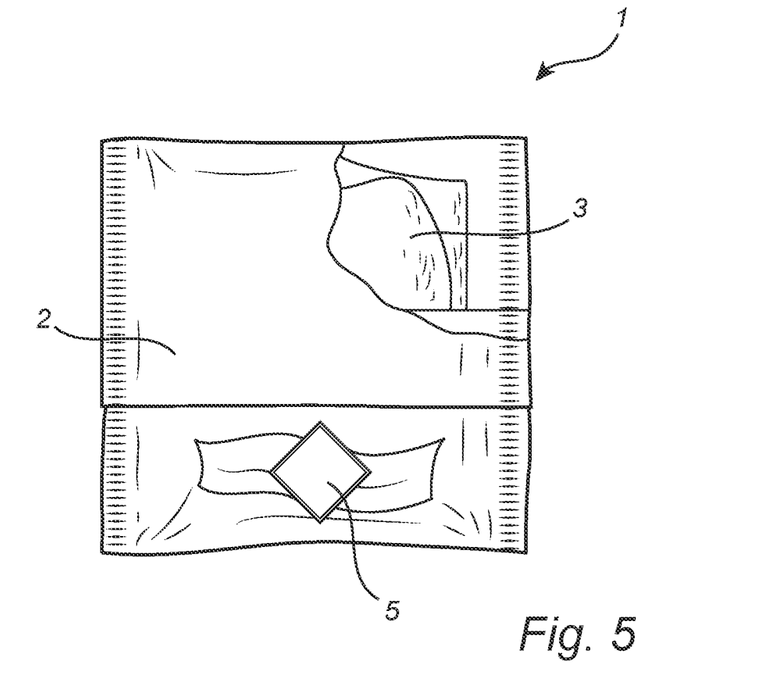
FIG. 5 illustrates another variant of a packaging comprising an absorbent hygienic article.

FIG. 5 illustrate another package 1 formed from a thermoplastic film 2. The film 2 is folded to form a pocket-shaped package 1. In this example, the package 1 comprises a single absorbent hygienic article 3. However, it will be understood that package-shaped packages 1 as illustrated in FIG. 4 or pocket-shaped packages 1 as illustrated in FIG. 5 may contain a single or a plurality of absorbent hygienic article 3. Also, a plurality of single-packed absorbent hygienic articles 3 may be packaged in an outer package.

In other, non-illustrated examples, there may be provided a package comprising absorbent articles such as absorbent tissue paper or nonwoven.

When the suitability for printing of a thermoplastic film for use in a packaging of absorbent hygienic articles has been established for a formed thermoplastic film, it is envisaged that no further evaluation needs to be made for this thermoplastic film. Accordingly, an array of packages may be formed from the thermoplastic film, e.g. an array comprising at least 1000 packages, such as at least 10 000 packages. Hence, a large number of packages may be formed where the suitability of the film for printing and for use in a packaging of absorbent hygienic articles need not again be verified.

However, since the use of recycled polymer material will necessarily imply that the properties of the thermoplastic film is altered each time a new source or batch of recycled polymer material is use, the suitability for printing of a thermoplastic film for use in a packaging of absorbent hygienic articles would need to be established for each such new source or batch.

The invention claimed is:

1. A method for establishing the suitability for printing of a thermoplastic film for use in a packaging of absorbent hygienic articles, said thermoplastic film comprising at least 30% recycled polymer material, the method comprising:
   providing a sample of said thermoplastic film, said sample being 10 cm×10 cm;
   scanning said sample to provide a pixelized image of said sample;
   computer analyzing said pixelised image using a thresholding method to transfer the image to a binary image in which each pixel is determined as either dark or light;
   defining each group of neighbouring pixels deemed to be dark as a Gel Spot;
   defining a Gel Spot Size for each Gel Spot being the circle equivalent diameter to the pixel area of the Gel Spot;
   determining an Amount of Gel Spots indicative of the number of Gel Spots in said sample, which have Gel Spot Size greater than or equal to 150 μm; and
   determining a Relative Gel Spot Coverage Area indicative of the relative area of said sample covered by Gel Spots having a Gel Spot Size greater than or equal to 150 μm, using said circle equivalent diameter; and
   if said Amount of Gel Spots is less than or equal to a first threshold and said Relative Gel Spot Coverage Area is less than or equal to a second threshold, determining that said thermoplastic film is suitable for printing; and
   if said Amount of Gel Spots is greater than said first threshold and/or said Relative Gel Spot Coverage Area is greater than said second threshold, determining that said thermoplastic film is not suitable for printing.

2. The method according to claim 1, wherein said first threshold is less than or equal to 450 per 100 cm² sample.

3. The method according to claim 1, wherein said second threshold is less than or equal to 20%.

4. The method according to claim 1, wherein said film comprises coloured pigments in the film resin.

5. The method according to claim 1, wherein said film has a thickness of between 20-70 μm.

6. The method according to claim 1, wherein said film comprises less than 80% recycled polymer material.

7. The method according to claim 1, wherein said film comprises:
   a. a total sum of phthalates being in the range 0.05 to 250 mg/kg (ppm); and/or
   b. a total sum of organic tin compounds being in the range 0.0003 to 0.5 mg/kg (ppm); and/or
   c. a total sum of heavy metals being in the range 0.1 to 100 mg/kg (ppm); and/or
   d. a total sum of Bisphenol A being in the range 0.05 to 20 mg/kg (ppm).

8. The method according to claim 1, wherein said method comprises determining a haze of said thermoplastic film, and
   if said haze is within a haze range, determining that said film is suitable for printing and for a packaging of hygienic absorbent products, and
   if said haze is outside of said haze range, determining that said film is unsuitable for printing and for a packaging of hygienic absorbent products,
   wherein said haze range is less than 25%, and
   wherein haze is measured as the percentage of incident light scattered by more than 2.5° through said film.

9. The method according to claim 8, wherein said haze range is less than 20%, or 4 to 18%.

10. The method according to claim 1, wherein said method comprises:
    Determining a MD force at 5% elongation in the machine direction of said film, and
    if said MD force at 5% elongation is within a MD force at 5% elongation range,
    determining that said film is suitable for printing and for a packaging for hygienic absorbent product, and
    if said MD force at 5% elongation is outside of said MD force at 5% elongation range,
    determining that said film is unsuitable for printing and for a packaging for hygienic absorbent products,
    wherein said MD force at 5% elongation range is greater or equal to 3 N/15 mm, and optionally 4 to 9 N/15 mm.

11. The method according to claim 1, wherein said method comprises:
    Determining a CD force at 5% elongation in the cross direction of said film, and
    if said CD force at 5% elongation is within a CD force at 5% elongation range,
    determining that said film is suitable for printing and for a packaging for hygienic absorbent product, and
    if said CD force at 5% elongation is outside of said CD force at 5% elongation range,
    determining that said film is unsuitable for printing and for a packaging for hygienic absorbent products,
    wherein said CD force at 5% elongation range is greater or equal to 3 N/15 mm, and optionally 4 to 9 N/15 mm.

12. The method according to claim 1, wherein said method comprises:
    Determining a CD 2% secant modulus in the cross direction of said film, if said CD 2% secant modulus is within a CD 2% secant modulus range, determining that said film is suitable for printing and for a packaging for hygienic absorbent product, and
    if said CD 2% secant modulus is outside of said CD 2% secant modulus range, determining that said film is unsuitable for printing and for a packaging for hygienic absorbent products, wherein said CD 2% secant modulus range is from 200 to 600 MPa.

13. The method according to claim 1, wherein said method comprises:

Determining a MD 2% secant modulus in the machine direction of said film, and if said MD 2% secant modulus is within a MD 2% secant modulus range, determining that said film is suitable for printing and for a packaging for hygienic absorbent product, and if said MD 2% secant modulus is outside of said MD 2% secant modulus range, determining that said film is unsuitable for printing and for a packaging for hygienic absorbent products, wherein said MD 2% secant modulus range is from 200 to 550 MPa.

14. A method of forming a package for absorbent articles comprising:

providing a thermoplastic film material;

determining said thermoplastic film to be suitable for printing for use in a packaging for hygienic absorbent articles by performing the method according to claim 1; and forming a package for hygienic absorbent articles comprising said thermoplastic film.

15. The method according to claim 14, comprising at least a portion of said film.

16. The method according to claim 14, wherein said step of forming a package comprises forming a package of said thermoplastic film such that said thermoplastic film forms an outer surface of said package.

17. The method according to claim 14, wherein said package comprises said thermoplastic film as a co-extruded monolayer film.

18. The method according to claim 14, wherein said step of forming a package comprises folding said thermoplastic film to form a pocket or bag.

19. The method according to claim 14, comprising filling said package with absorbent hygienic articles.

20. The method according to claim 19, wherein said absorbent articles is a stack of sanitary articles.

21. The method according to claim 19, wherein said absorbent articles comprise absorbent tissue paper or nonwoven.

22. A package for an absorbent article made by the method according to claim 14.

23. The package according to claim 22, wherein said thermoplastic film comprises at least 30 to 80% by weight recycled polymers, and said thermoplastic film has a continuous unprinted area (4) of at least 10×10 cm, wherein said thermoplastic film has a Gel Spot Amount being less than or equal to 450 per 100 $cm^2$ sample and a Gel Spot Relative Coverage Area being less than or equal to 20%, as determined by the method according to any one of claims 1-12.

24. The package according to claim 23, wherein, in said package, said thermoplastic film has a printed area outside of said continuous unprinted area.

25. The package according to claim 23, wherein said thermoplastic film, at least in said unprinted area, is transparent.

26. The package according to claim 22, wherein said thermoplastic film comprises coloured pigment in the film resin.

27. An array of at least 1000 packages according to claim 22, the packages having similar appearance and content.

28. The package according to claim 22 comprising an absorbent hygienic article.

29. The method according to claim 1 comprising forming an array of packages of said film, said array comprising at least 1000 packages.

30. The method according to claim 1, wherein said first threshold is less than or equal to 300 per 100 $cm^2$ sample.

31. The method according to claim 1, wherein said second threshold is less than or equal to 12%.

32. The method according to claim 1, wherein a total sum of phthalates is in the range 0.05 to 100 mg/kg (ppm) or 0.05 to 20 mg/kg (ppm); and/or a total sum of organic tin compounds is in the range 0.0003 to 0.1 mg/kg (ppm) or 0.0003 to 0.02 mg/kg (ppm); and/or a total sum of heavy metals is in the range 0.1 to 60 m/kg (ppm) or 0.1 to 30 mg/kg (ppm); and/or a total sum of Bisphenol A is in the range 0.05 to 10 mg/kg (ppm) or 0.05 to 5 mg/kg (ppm).

33. The method according to claim 1, comprising forming an array of packages of said film, said array comprising at least 10,000 packages.

* * * * *